J. N. GOULD.
ROAD GRADER.
APPLICATION FILED MAR. 5, 1915. RENEWED FEB. 4, 1919.

1,298,331.

Patented Mar. 25, 1919.
6 SHEETS—SHEET 1.

Fig. 1.

Witnesses:
Frank H. Borden
A. A. Hammond

Inventor:
John N. Gould
By Louis Bagger & Co.
his Attys.

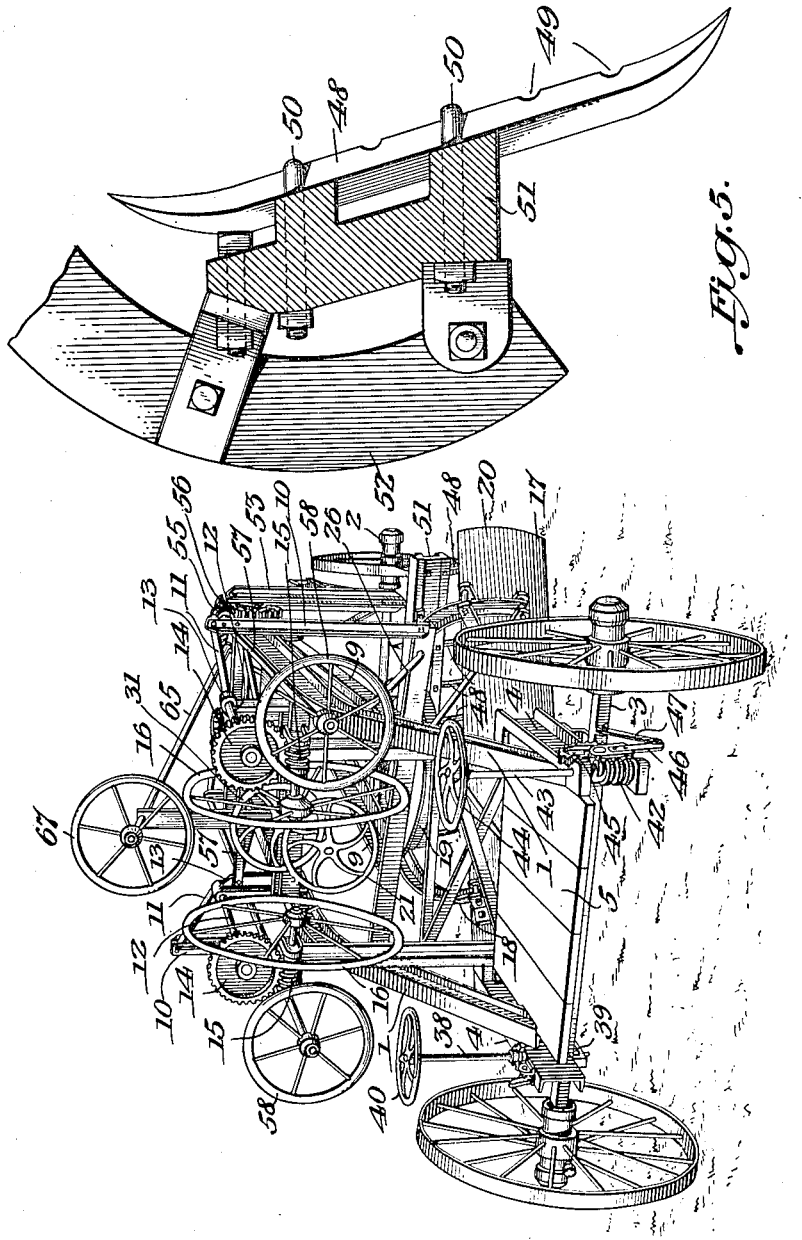

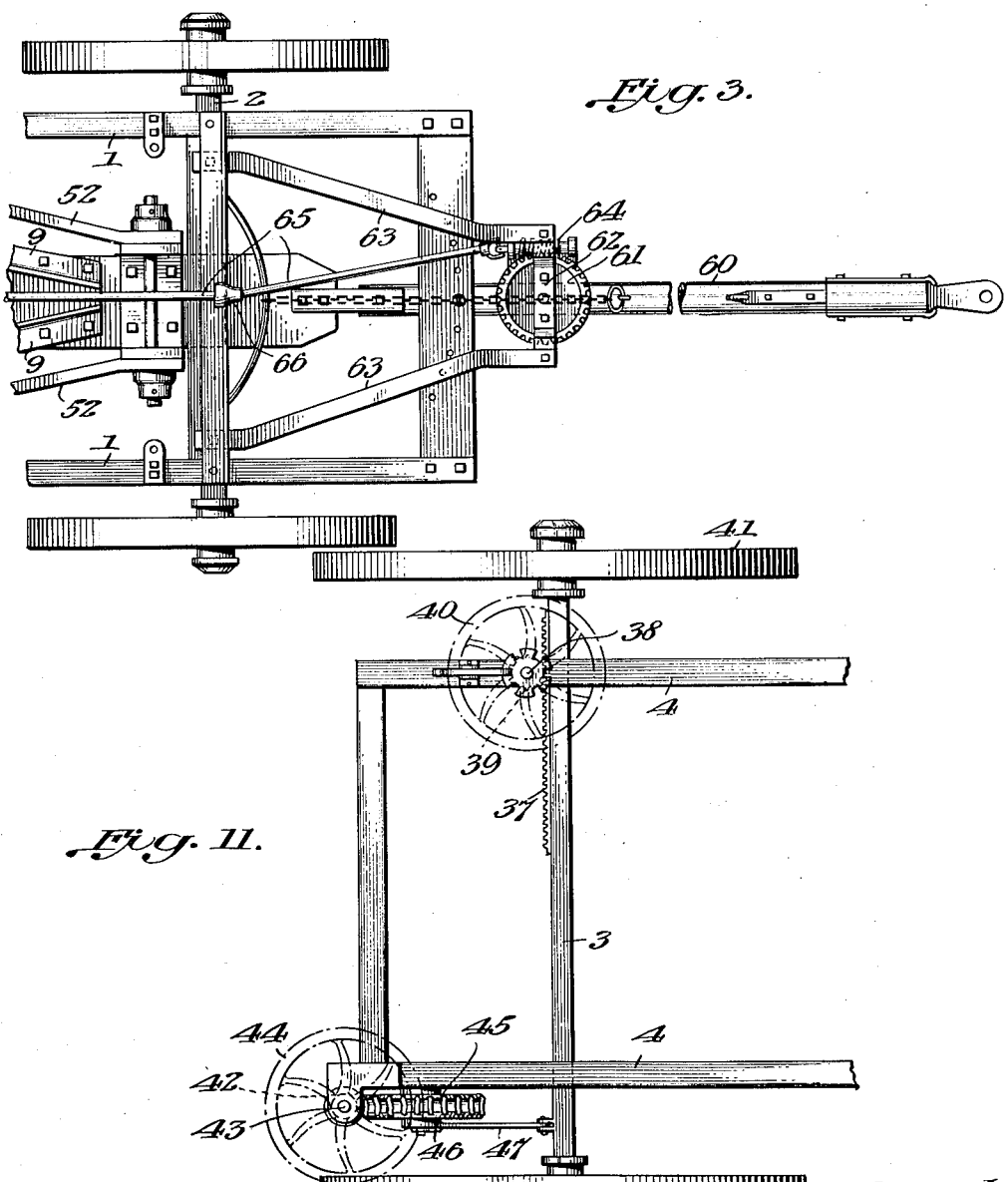

J. N. GOULD.
ROAD GRADER.
APPLICATION FILED MAR. 5, 1915. RENEWED FEB. 4, 1919.
1,298,331.
Patented Mar. 25, 1919.
6 SHEETS—SHEET 4.
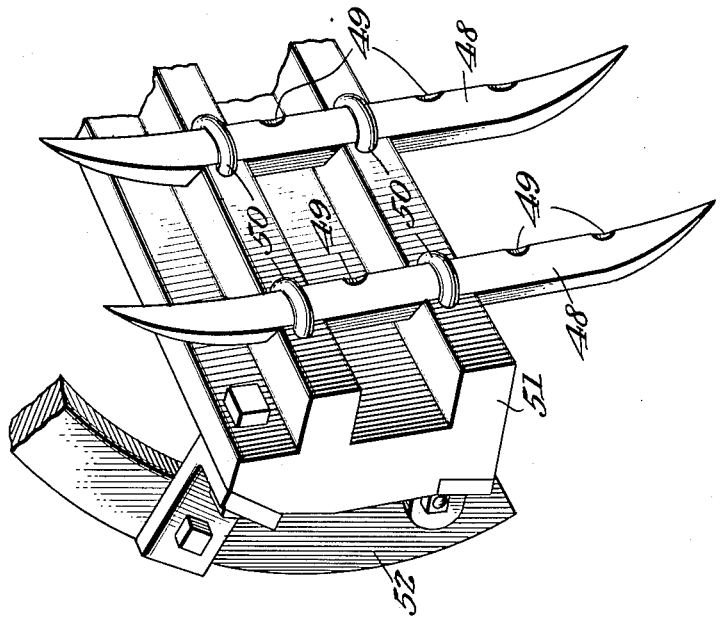
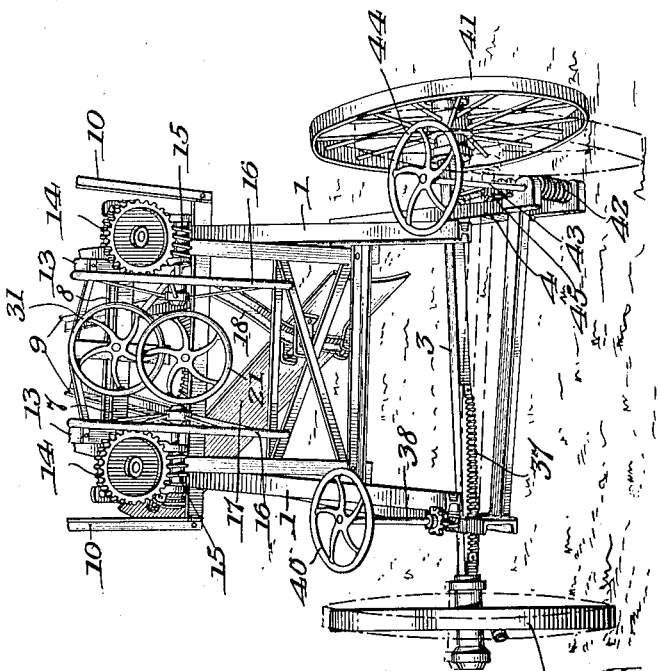

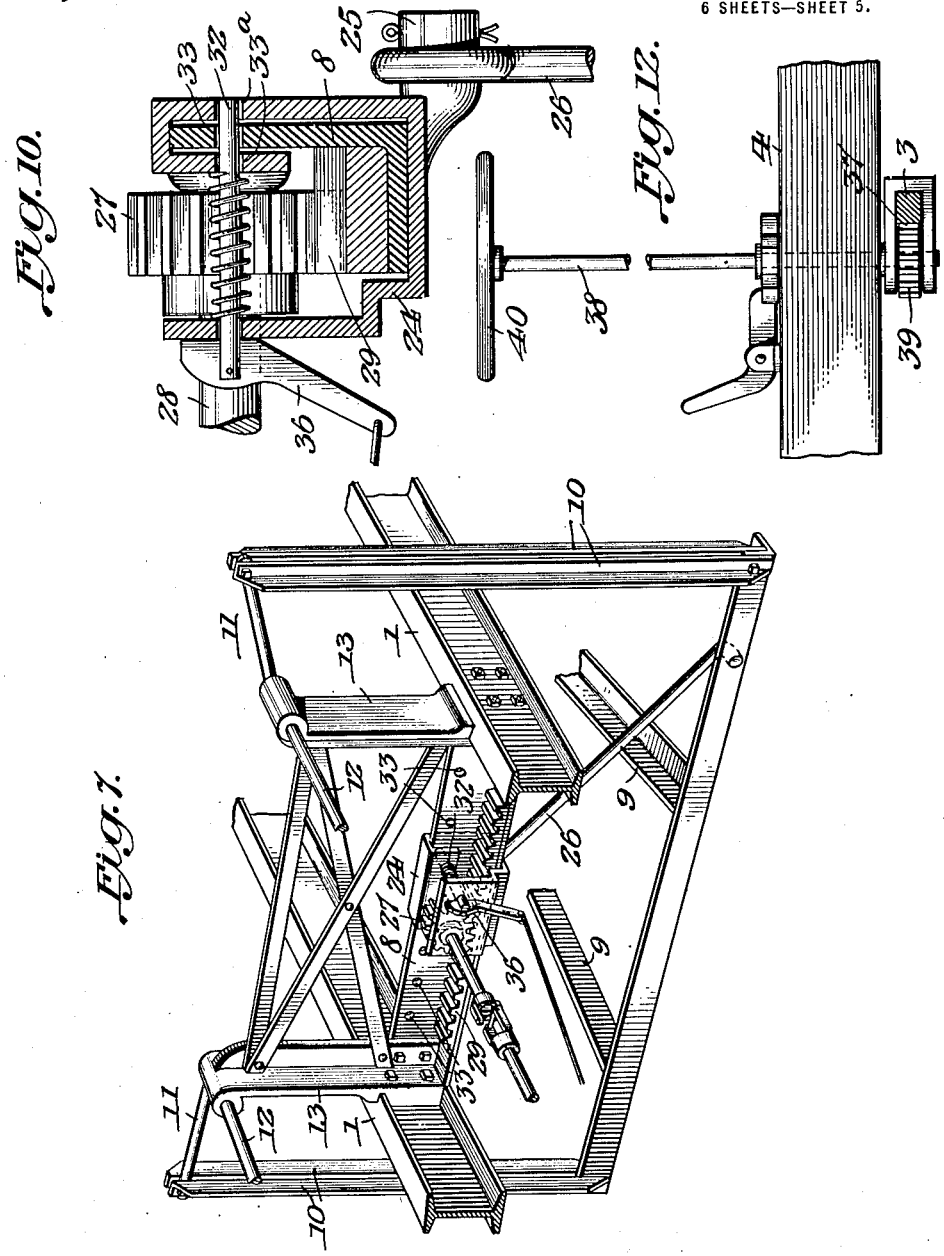

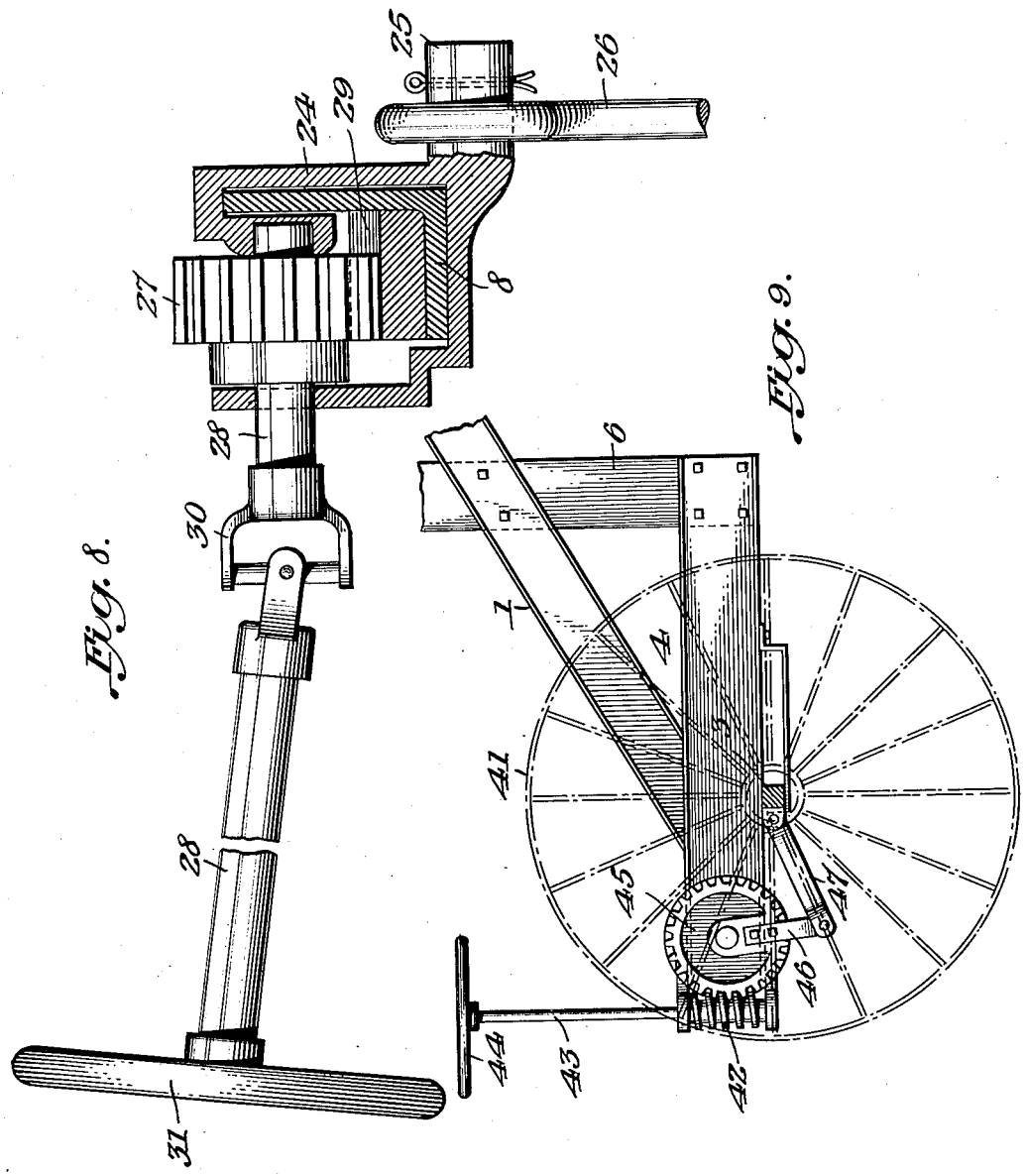

UNITED STATES PATENT OFFICE.

JOHN N. GOULD, OF FREDERICKTOWN, OHIO, ASSIGNOR TO THE F. B. ZIEG MFG. COMPANY, OF FREDERICKTOWN, OHIO.

ROAD-GRADER.

1,298,331. Specification of Letters Patent. Patented Mar. 25, 1919.

Application filed March 5, 1915, Serial No. 12,353. Renewed February 4, 1919. Serial No. 274,999.

*To all whom it may concern:*

Be it known that I, JOHN N. GOULD, a citizen of the United States, residing at Fredericktown, in county of Knox and State of Ohio, have invented certain new and useful Improvements in Road - Graders, of which the following is a specification.

My invention relates to an improvement in road graders for road-building and ditching, and the object is to provide improved mechanism for more perfect control of the machine, and more especially the mold-board or scraper, means being provided within the reach of the operator for swinging the tongue or pole; both for turning the mold-board to adjust its angle, and for shifting it with the frame which carries it laterally in either direction for raising and lowering the mold-board, whereby to regulate the depth of cut; for scarifying the soil in advance of the mold-board or scraper; and for regulating the elevation of the scarifier either as a whole or at either side independently of the other; and for swinging the rear axle to facilitate the turning of the machine to its work; and for shifting the rear end of the frame laterally with respect to the axle, in other words endwise of the axle.

In the accompanying drawings:—

Figure 1 is a view in perspective from one side;

Fig. 2 is a rear perspective;

Fig. 3 is a view in perspective from the front;

Fig. 4 is a rear view in perspective with parts removed;

Fig. 5 is an enlarged vertical longitudinal sectional view through the scarifier;

Fig. 6 is a fragmentary front elevation of the means which supports the scarifier;

Fig. 7 is a transverse sectional view through the main frame showing the cross-bar and casting which is adjustable thereon;

Fig. 8 is a longitudinal vertical section through this cross-bar; and

Figs. 9, 10, 11 and 12 are details.

The numerals 1, 1, represent the longitudinal I-beams, of which there are two, of the machine. These extend from front to rear and throughout the length of the machine, being supported at the forward end on the forward axle 2, and at the rear end by the rear axle 3. They are bowed upwardly through the center, as shown in Fig. 1, and at the rear they are securely bolted to the sides 4 of the platform 5 as well as to the sides of the standards 6, 6, erected from the forward end of the platform.

A connecting-bar 7 extends across and is securely bolted to the upper edges of the I-beams 1, 1, a little forward of the standards 6, 6, and just forward of this connecting-bar 7 is a cross-bar 8 preferably of angle-iron, the ends of which are bolted to the inner faces of the I-beams 1, 1, as shown in Fig. 7.

The scraper or mold-board frame comprises two converging angle-irons 9, 9, which meet at the forward end, of the machine where they are supported by the front axle 2; and at the rear end these angle-irons 9, 9, are bolted to the U-shaped frame 10, the sides of which extend upwardly on either side of the longitudinal I-beams 1, 1, and the upper ends of this U-shaped frame are pivotally supported on the cranks 11, 11, on the forward ends of the crank-shafts 12, 12, which latter are journaled in the upper ends of the standards 6, 6, and in the uprights 13, 13, erected from the angle-iron cross-bar 8. These shafts 12, 12 are provided with worm-wheels 14, 14, on their rear ends, which latter are turned through the medium of worms 15, 15, and these worms are turned by means of the large hand-wheels 16, 16, disposed parallel with each other and with the I-beams 1, 1, a little above the platform 5 within reach of the operator.

The mold-board or scraper 17 is held by yoke 18 to the turn-table 19, and the latter is turned by means of the shaft 20, said shaft having a hand-wheel 21 on its rear end, by which the operator turns it, and a pinion 22 on the forward end which engages a rack 23 on the turn-table 19 for adjusting the angle of the scraper or mold-board.

It is also possible to adjust the entire frame 9 and 10 laterally or crosswise of the machine to regulate the position of the scraper or mold-board. A casting 24 is slidably mounted on the cross angle-iron 8.

This has a stub 25 on its forward end, from which a rod 26 is hung, and this rod 26 extends to one of the lower corners of the U-shaped frame 10. A gear-wheel 27 is keyed on a shaft 28, the forward end of which shaft is journaled in the casting 24, and its teeth engage the teeth of a rack 29. So as the shaft is turned, the casting 24 travels to the right or to the left on the angle-iron cross-bar 8, and with it the frame 9—10 moves either to the right or to the left. The shaft 28 has a universal joint 30 in it, and its forward end is provided with a hand-wheel 31 by which the operator turns it to the right or to the left.

A spring-actuated slide-bolt 32 is slidably connected with the casting 24, and is adapted to lock the casting by passing through one of the holes 33 therefor in the angle-iron cross-bar 8, and this spring-actuated bolt 32 is controlled by the cam-lever 34 pivotally connected with the bolt, and having a rod 35 connected with it, a pull upon which causes the withdrawal of the bolt by causing the cam face 36 of the lever 34 to fulcrum upon the surface of the casting 24, thus withdrawing the bolt, and the spring acts to lock the casting to the angle-iron cross-bar 8 when the holes 33 and 33ª are in registry. Other means might be employed for shifting and locking these parts, and this is but one of many that might be used.

Means is provided for moving the rear end of the frame laterally with respect to the rear axle 3, that is to say lengthwise of the axle. This is accomplished through the rack 37 on the rear of the axle 3, and the vertically-disposed shaft 38, which has a pinion 39 thereon, the teeth of which engage the rack. This shaft 38 is located at the rear left-hand corner of the machine within reach of the operator, and has a hand-wheel 40 by which it is turned. By this means, the entire rear end of the machine may be shifted with respect to the rear axle by means of the wheels 41, 41, which is sometimes very desirable in the operation of ditching and grading.

Again, it is possible to swing the rear axle at an angle to the frame, and this may be accomplished through the worm 42 on the lower end of the vertical shaft 43 at the rear right-hand corner of the frame, and which shaft has a hand-wheel 44 on its upper end within reach of the operator. This worm 42 engages a worm-wheel 45, and secured to this is a lever 46, and from which a link 47 extends to the axle 3, so that as the wheel 44 on the shaft 43 is turned, the right-hand end of the rear axle may be swung forward or rearward, as the case may be.

A scarifier is arranged transversely in front of the scraper or mold-board. This is composed of a plurality of teeth 48, eight of which are shown. These teeth are sharpened at each end, and reversible, and provided with several notches 49, in which the clips 50 (two of which are shown) engage, these clips being used as a means for bolting the teeth to the cast-iron frame 51. The latter is bolted to the rear ends of the angle-iron bars 52, 52, which latter are pivoted at the forward end of the machine over the front axle 2. The rear ends of the angle-iron bars 52, 52, are pivotally connected to the lower ends of the hangers 53, 53, one on either side of the machine, and the upper ends of these hangers are pivotally connected with levers 54, 54, on the worm-wheels 55, 55, and these are engaged and turned by the worms 56, 56, on the forward ends of the horizontal shafts 57, 57. Hand-wheels 58, 58, on the rear ends of the horizontal shafts are provided within reach of the operator for turning them.

In this way the scarifier is raised or lowered bodily, or more at one end than the other, as may be desired.

The tongue 60 is capable of being swung to the right or left, and held in any position therebetween, and for this purpose it is pivoted coincident with the center of oscillation of the forward axle 2. A worm-wheel 61 is secured on the tongue, plate 62 is secured to this worm-wheel, and links 63, 63 are pivotally connected to the ends of the plate 62, at their forward ends, and at their rear ends to the front end of the frame. A worm 64 engages the worm-wheel 61, and a rod 65 having a universal joint 66 therein carries this worm at its forward end, and has a hand-wheel 67 at its rear end, whereby the rod 65 is turned to turn the worm 64 and worm wheel 61, and in that way swing the tongue or pole to the right or left.

In this way, it will be seen that all of the adjusting means are located within reach of the operator riding on the platform 5, so that he has complete control of every part of the machine.

More or less slight changes might be resorted to in the form and arrangement of the several parts described without departure from the spirit and scope of my invention, and hence I do not wish to be limited to the exact construction herein set forth, but:—

I claim:

In a road-grader, the combination of a main frame, a scraper or mold-board frame connected at its forward end to the main frame, a scraper or mold-board carried by the scraper or mold-board frame, adjustable means of suspension for the opposite ends of said scraper or mold-board frame, means for laterally adjusting the suspended end of the scraper or mold-board frame, said means comprising a cross-bar, a casting mounted to slide thereon, a rack, a shaft journaled in the casting, and carrying a pinion, the teeth of which engage the rack, means extending from the casting to the rear end of the moldboard frame, whereby, when the shaft is turned, the casting and frame are shifted laterally or cross-wise of the frame of the machine, and means for locking said casting to the cross-bar comprising a spring-actuated bolt, a cam-lever connected therewith, and means for controlling the position of the cam-lever.

In testimony whereof I affix my signature in the presence of two witnesses.

JOHN N. GOULD.

Witnesses:
 ERNEST V. ACKERMAN,
 JOHN COOKE.